No. 839,920. PATENTED JAN. 1, 1907.
C. A. CORNWALL.
GRAMOPHONE SPEED INDICATOR.
APPLICATION FILED AUG. 9, 1906.

WITNESSES.
F. C. Gibson.
May E. Immich.

INVENTOR
Clement A. Cornwall.
BY
Fred G. Dieterich
ATTORNEY

UNITED STATES PATENT OFFICE.

CLEMENT A. CORNWALL, OF ASHCROFT, BRITISH COLUMBIA, CANADA.

GRAMOPHONE SPEED-INDICATOR.

No. 839,920.         Specification of Letters Patent.         Patented Jan. 1, 1907.

Application filed August 9, 1906. Serial No. 329,857.

*To all whom it may concern:*

Be it known that I, CLEMENT A. CORNWALL, a citizen of Canada, residing at Ashcroft, in the Province of British Columbia, Canada, have invented a new and useful Gramophone Speed-Indicator, of which the following is a specification.

This invention relates to an improved means for indicating the movement of the brake-screw by which the speed of the mechanism which rotates a gramophone-record is controlled.

The mechanism by which a gramophone-record is rotated is generally controlled by a small brake acting on the periphery of a rotatable part of the mechanism, which brake is operated by a screw threaded through the casing and bearing on the end of the lever to which the brake is attached. The movement of the screw to effect a variation of the speed of rotation is so slight that difficulty is experienced in setting the brake to give any desired speed. This difficulty I have overcome by providing a light pointer which will multiply the movement of the brake-screw or its lever and will indicate the amount of such movement on a graduated scale, so that if a certain position of the pointer is found to give a satisfactory speed for any particular record the corresponding number on the scale may be noted on the record and the brake control may be again set to that mark with some assurance that the same result will be attained.

There are also other novel features in the arrangement and application of the device to which attention is drawn in the following specification, which fully describes my invention, reference being made to the drawings by which it is accompanied, in which—

Figure 1:
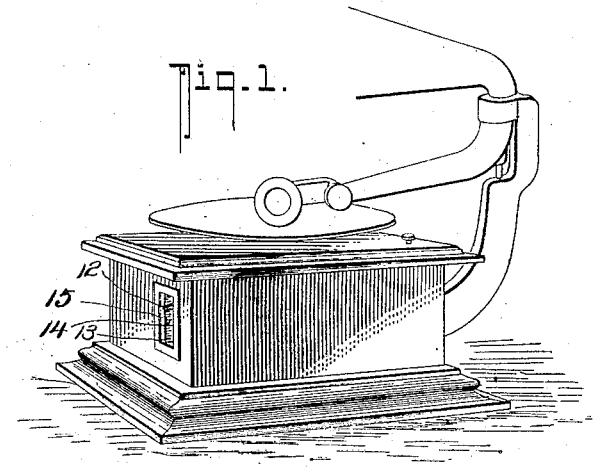
Figure 2:
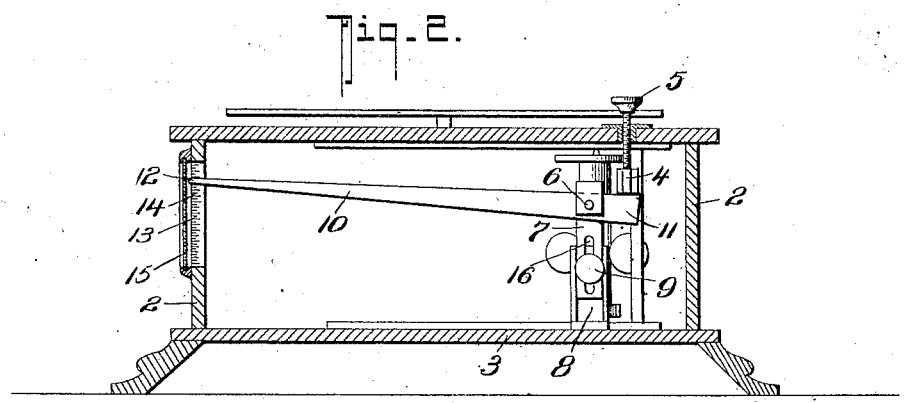
Figure 3:
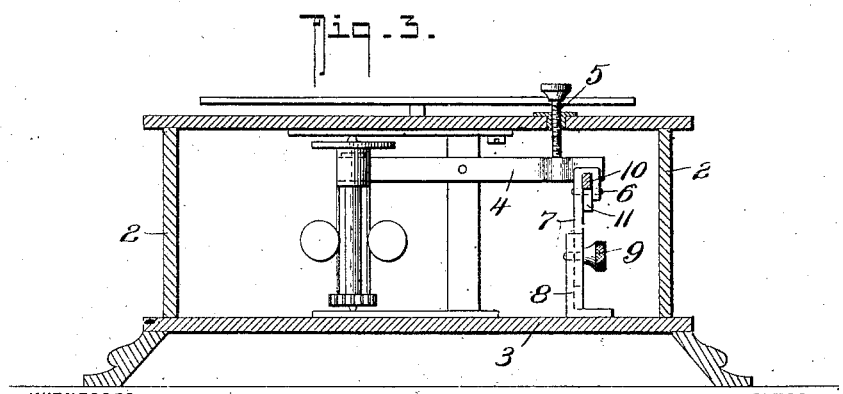

Figure 1 is a perspective view of a gramophone with my invention applied. Fig. 2 is a vertical longitudinal section thereof, showing my invention and the parts immediately connected therewith, the remaining portion of the gramophone mechanism being omitted for clearness of illustration. Fig. 3 is a cross-section thereof.

In the drawings, 2 represents the casing or box which incloses the mechanism, 3 being the base. 4 is the lever by which the brake is applied, and 5 the screw by which such lever is operated.

Adjacent to the end of the brake-lever 4 to which the screw 5 is applied is pivotally mounted on a fulcrum-pin 6 a light lever 10, the short end 11 of which is in engagement with the under side of the lever 4 and the longer end is produced though a vertical slot 13 in the casing 2 to form an indicating-pointer 12. The fulcrum-pin 6 is secured in a member 7, vertically adjustable in an attachment 8, secured to the base 3 of the casing by a screw 9 in an elongated aperture 16. The edge of the slot 13 of the casing is provided with a graduated scale 14, and the slot may be covered with a glass 15 to exclude dust.

Any movement of the end of the lever 4 to vary the speed of the record-rotating mechanism will thus be multiplied and indicated by the pointer 12 on the scale 14, and the reading on the scale for the various records may be noted on them to afford a means for future setting of the brake without the necessity of preliminary trial.

The vertical movement of the fulcrum-pin 6 affords a means for setting the pointer 12 to the graduations of the scale.

The device is simple and readily applied and requires no alteration of existing mechanism.

Having now particularly described my invention and the manner of its application and use, I hereby declare that what I claim as new, and desire to be protected by Letters Patent, is—

1. The combination with the pivotally-mounted brake-lever of a gramophone and an adjusting-screw therefor, of a pivotally-mounted pointer, a support to which said pointer is pivotally mounted, said support comprising a fixed base member having a slideway, a supplemental member connected to said fixed base member and held in said slideway, said supplemental member having a slot portion, a set-screw passing through said slot portion into the fixed member, and a graduated scale coöperating with the free end of said pointer, substantially as shown and described.

2. In a device of the class described, the combination with the brake-lever, of a pivotally-mounted pointer coöperating therewith, a support to which said pointer is pivotally mounted, said support comprising a fixed adjustment and a member vertically adjustable in said fixed adjustment, said pointer being pivotally mounted to said vertically-adjustable member, a casing for the whole, said casing having a slot through which the end of the pointer projects, a graduated scale secured to the casing adjacent the slot, and a glass covering for the slot and the scale substantially as shown.

In testimony whereof I have signed my name to this specification in the presence of two subscribing witnesses.

CLEMENT A. CORNWALL.

Witnesses:
CLEMENT FRANCIS CORNWALL,
FITZALAN V. CORNWALL.